United States Patent [19]

Helmstetter

[11] Patent Number: 5,070,819
[45] Date of Patent: Dec. 10, 1991

[54] PET COMB FOR ATTACHMENT TO SPRAY CAN

[76] Inventor: Fred Helmstetter, 5032 S. Sunkist, Tucson, Ariz. 85746

[21] Appl. No.: 658,765

[22] Filed: Feb. 21, 1991

[51] Int. Cl.$^5$ .............................................. A01K 13/00
[52] U.S. Cl. ...................................... 119/86; 401/190
[58] Field of Search ..................... 119/86, 156, 159; 132/289, 290, 291; 401/190; 239/288

[56] References Cited

U.S. PATENT DOCUMENTS

| | | | |
|---|---|---|---|
| 3,302,235 | 2/1967 | Gerber | 401/190 |
| 3,346,908 | 10/1967 | Johnson | 401/190 |
| 3,550,857 | 12/1970 | Ahlberg | 401/190 |
| 3,565,541 | 2/1971 | Vallis | 401/190 X |
| 3,636,963 | 1/1972 | Olson | 401/190 X |
| 3,682,557 | 8/1972 | Simon et al. | 401/190 X |
| 3,732,591 | 5/1973 | Gach | 401/190 |
| 3,754,831 | 8/1973 | Hutter | 401/190 |

Primary Examiner—Gene Mancene
Assistant Examiner—Thomas Price
Attorney, Agent, or Firm—William E. Hein

[57] ABSTRACT

A pet comb includes a semicircular clamp member that may be snapped into place over the body of a conventional aerosol can of flea and tick spray and an outwardly and upwardly tangentially extending comb arm terminating in a plurality of blunt teeth at an outer edge thereof. When moved forward over the pet's coat, the plurality of teeth serve to lift the hair to expose the pet's skin for receiving the sprayed contents of the aerosol can.

2 Claims, 1 Drawing Sheet

PET COMB FOR ATTACHMENT TO SPRAY CAN

BACKGROUND AND SUMMARY OF THE INVENTION

This invention relates generally to flea and tick sprays for application to pets and more particularly to a comb that is adapted to be clamped onto a conventional aerosol can containing such sprays. It is frequently necessary to spray pets, such as cats and dogs, with flea and tick insecticide sprays to repel or kill insects that are attracted to these animals. These insecticide sprays are typically packaged in conventional aerosol spray cans and are most effective if the spray reaches the skin of the animal being sprayed as opposed to simply remaining on the surface of the animal's coat. This can only be accomplished by lifting the hair of the animal as the insecticide spray is being applied. In accordance with the crude prior art, the user typically holds the spray can in one hand, while using the fingers of the other hand to comb the pet's hair forward to thereby expose its skin to the spray. This procedure generally results in the application of as much spray to the user's hand as to the pet. In addition, it does not result in uniform lifting of the pet's hair during application of the spray.

It is therefore a principal object of the present invention to provide, in accordance with the illustrated preferred embodiment thereof, a comb device that may be quickly and easily attached to a conventional aerosol spray can and that serves to uniformly move the pet's hair forward in concert with the motion of the spray can imparted by the user and slightly forward of the emitted spray to thereby facilitate application of the insecticide spray directly to the pet's skin.

DETAILED DESCRIPTION OF THE INVENTION

Figure 1:
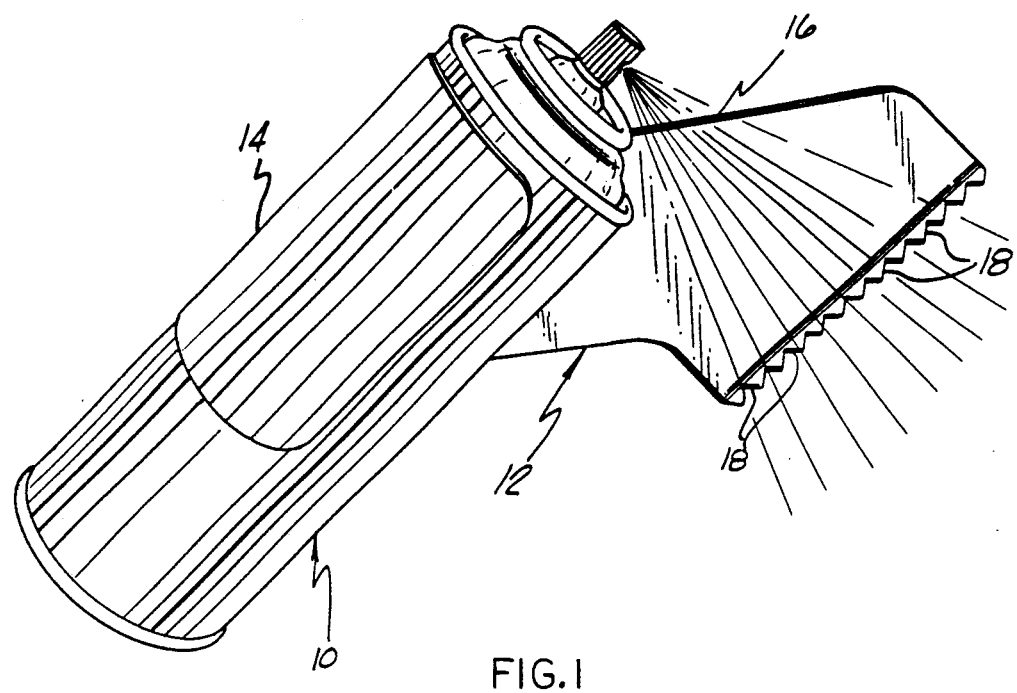
FIG. 1 is a pictorial diagram illustrating the way in which the pet comb of the present invention is attached to a conventional aerosol spray can.
Figure 2:
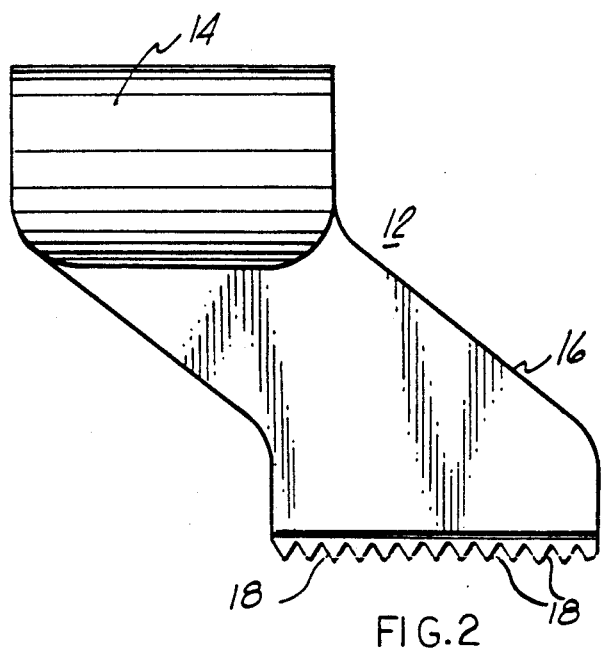
FIG. 2 is a side view of the pet comb of the present invention.
Figure 3:
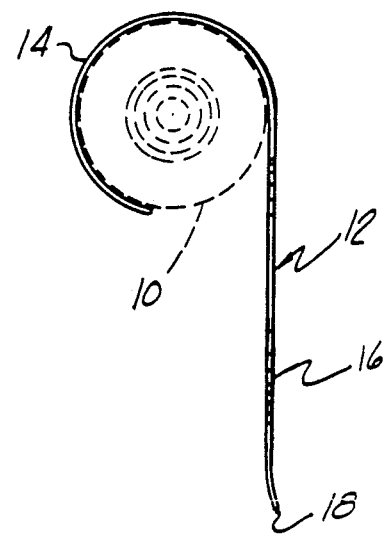
FIG. 3 is an end view of the combination of the pet comb and aerosol spray can illustrated in FIG. 1.

Referring now to the drawings, there is shown a conventional cylindrical aerosol spray can 10 containing a typical flea and tick insecticide for application to household pets, as well as other animals. A comb member 12 includes a semicircular clamp portion 14 that is adapted to be snapped onto the cylindrical body of spray can 10 and a flat comb arm 16 that extends outward tangentially from semicircular clamp portion 14, as well as upward therefrom. Flat comb arm 16 terminates in a distal edge formed as a plurality of somewhat blunt teeth 18. The plurality of teeth 18 are arranged in a line that is generally parallel to the longitudinal axis of aerosol can 10 and are bent slightly away from can 10 to provide improved lifting action of the pet's hair during use. Comb member 12 may be fabricated of any of a number of commercially available metal or plastic materials. For example, it may be stamped out of flat metal stock, and the clamp portion 14 may then be formed into a semicircular shape, as illustrated, such that it may be conveniently snapped into place on spray can 10.

In preparation for use, spray can 10 may be longitudinally translated as well as rotated within clamp portion 14 of comb member 12 such that the emitted spray is centrally directed along the plurality of teeth 18 and slightly rearward thereof, as illustrated in FIG. 1. When so adjusted, and as the combination of spray can 10 and comb member 12 is moved forward over the pet, the plurality of teeth 18 that are slightly bent forward away from spray can 10 serve to lift the pet's hair so that the spray emitted from can 10 is substantially applied to the exposed skin of the pet to greatly improve its effectiveness. At such time as the spray contents of can 10 have been spent, comb member 12 may be simply snapped off the spent can and snapped onto a full can for further use.

I claim:

1. A pet comb for removable attachment to an aerosol spray can, of the type having a cylindrical body and a nozzle at one end thereof for emitting a spray in a direction perpendicular to a longitudinal axis of the spray can, the pet comb being operative for lifting the pet's hair forward in concert with forward motion of the spray can imparted by the user to thereby expose the pet's skin for receiving the spray emitted from the nozzle of the spray can, the pet comb comprising:

a semicircular clamp portion adapted for being removably snapped onto the cylindrical body of said spray can; and a rigid flat comb arm extending tangentially away from said semicircular clamp portion in a direction perpendicular to the longitudinal axis of the spray can, said rigid flat comb arm having a distal flat edge containing a plurality of blunt teeth, said plurality of blunt teeth being positioned in a straight line that is substantially parallel to the longitudinal axis of said spray can;

said semicircular clamp portion permitting said spray can to be rotated and longitudinally translated therein such that the spray emitted from said nozzle is centrally directed along the distal edge of said rigid flat comb arm containing said plurality of teeth and somewhat rearward thereof.

2. A pet comb as in claim 1 wherein said plurality of blunt teeth are bent slightly away from said semicircular clamp portion of said pet comb to provide improved lifting of the pet's hair in advance of the emitted spray.

* * * * *